US012558942B2

(12) United States Patent　　　(10) Patent No.:　US 12,558,942 B2
Lim et al.　　　　　　　　　　　　(45) Date of Patent:　　　Feb. 24, 2026

(54) VEHICLE THERMAL MANAGEMENT SYSTEM AND METHOD FOR CONTROLLING THE SAME

(71) Applicants: HYUNDAI MOTOR COMPANY, Seoul (KR); KIA CORPORATION, Seoul (KR)

(72) Inventors: Tae Woong Lim, Hwaseong-si (KR); Jun Ho Baek, Ansan-si (KR); Joon Hyung Park, Hwaseong-si (KR); Dong Myeong Lee, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 162 days.

(21) Appl. No.: 18/626,978

(22) Filed: Apr. 4, 2024

(65) Prior Publication Data

US 2025/0128572 A1　　Apr. 24, 2025

(30) Foreign Application Priority Data

Oct. 19, 2023　(KR) ........................ 10-2023-0140554

(51) Int. Cl.
B60H 1/22　　　　(2006.01)
B60H 1/00　　　　(2006.01)

(52) U.S. Cl.
CPC ........... *B60H 1/22* (2013.01); *B60H 1/00507* (2013.01)

(58) Field of Classification Search
CPC .. B60H 1/22; B60H 1/00507; B60H 1/00885; B60H 1/143; B60H 1/00278; B60H 1/32284; B60H 1/3213; B60H 2001/00307; B60R 16/03; B60Y 2200/90
See application file for complete search history.

*Primary Examiner* — Emmanuel E Duke
(74) *Attorney, Agent, or Firm* — Lempia Summerfield Katz LLC

(57)　　　　　　　　ABSTRACT

A vehicle thermal management system includes a HVAC subsystem; a power electronics cooling subsystem; a plurality of heat recovery drive components; and a controller. The controller includes a required heat calculation module to calculate a required heat quantity for a heating operation of the HVAC subsystem. The controller includes a coefficient of performance (COP) calculation module to calculate a maximum COP of the HVAC subsystem in the heating mode and a heat recovery calculation module to calculate a maximum heat recovery quantity of the HVAC subsystem and a total sum of estimated heat recovery quantities recoverable from the plurality of heat sources. The controller also includes a power determination module to determine respective amounts of power input to the plurality of heat recovery drive components based on the total sum of estimated heat recovery quantities and the maximum heat recovery quantity.

16 Claims, 3 Drawing Sheets

VEHICLE THERMAL MANAGEMENT SYSTEM AND METHOD FOR CONTROLLING THE SAME

CROSS-REFERENCE TO RELATED APPLICATION

This application is based on and claims the benefit of and priority to Korean Patent Application No. 10-2023-0140554, filed on Oct. 19, 2023, in the Korean Intellectual Property Office, the disclosure of which is incorporated herein in its entirety by reference.

TECHNICAL FIELD

The present disclosure relates to a vehicle thermal management system and a method for controlling the same. More particularly, the present disclosure relates to a vehicle thermal management system and a method for controlling the same to optimally control heat recovery drive components that operate when recovering heat from heat sources, such as outdoor air, power electronic components, and indoor air of a passenger compartment. Thus, power consumption is optimized.

BACKGROUND

With a growing interest in energy efficiency and environmental issues, there is a demand for development of eco-friendly vehicles that can replace internal combustion engine vehicles. Such eco-friendly vehicles are classified into electric vehicles, which are driven using fuel cells or electricity as a power source, and hybrid vehicles, which are driven using an engine and a battery.

Electric vehicles or hybrid vehicles may include a vehicle thermal management system for air conditioning in a passenger compartment and maintaining a battery and/or power electronic components at optimal temperatures. The vehicle thermal management system may include a heating, ventilation, and air conditioning (HVAC) subsystem for air conditioning in the passenger compartment, a power electronics cooling subsystem configured to maintain the power electronic components of a power electronics system at appropriate temperatures, and a battery cooling subsystem configured to maintain the battery at an appropriate temperature.

When the HVAC subsystem operates in a heating mode, the HVAC subsystem may be configured to absorb heat from outdoor air flowing in through a front grille of the vehicle, heat generating components (the power electronic components, the battery, and the like), indoor air in the passenger compartment, and the like.

In a case in which a refrigerant fails to sufficiently absorb heat from the outdoor air, the heat generating components, and the indoor air of the passenger compartment when the HVAC subsystem operates in the heating mode, the pressure and temperature of the refrigerant expanded by an expansion valve may relatively decrease. Accordingly, a suction pressure of a compressor may decrease and circulation efficiency of the refrigerant by the compressor may be relatively reduced. To solve such problems, it is necessary to maximize the quantity of heat absorbed from the outdoor air and waste heat of the heat generating components.

However, in order to maximize the quantity of heat absorbed from the outdoor air and the waste heat of the heat generating components, the overall operating amount of related drive components may increase, resulting in increased electric energy consumption. For example, as the revolutions per minute (RPM) of a circulation pump of the power electronics cooling subsystem and/or the RPM of a circulation pump of the battery cooling subsystem, the RPM of a cooling fan adjacent to an exterior heat exchanger, and the like are set to maximum values, power consumption may increase, and thus electric efficiency of the vehicle may be reduced.

The above information described in this background section is provided to assist in understanding the background of the inventive concept and may include any technical concept which is not considered as the prior art that is already known to those having ordinary skill in the art.

SUMMARY

The present disclosure has been made to solve the above-mentioned problems occurring in the prior art while advantages achieved by the prior art are maintained intact.

Aspects of the present disclosure provide a vehicle thermal management system and a method for controlling the same configured to optimally control heat recovery drive components that operate when recovering heat from heat sources, such as outdoor air, power electronic components, and indoor air of a passenger compartment. Thus, power consumption may be optimized.

According to an aspect of the present disclosure, a vehicle thermal management system may include a heating, ventilation, and air conditioning (HVAC) subsystem including a refrigerant circulation path through which a refrigerant circulates. The system may also include a power electronics cooling subsystem including a power electronics coolant circulation path through which a power electronics coolant circulates. The system may also include a plurality of heat recovery drive components configured to allow the HVAC subsystem to recover heat from a plurality of heat sources when the HVAC subsystem operates in a heating mode. The system may also include a controller including a required heat calculation module configured to calculate a required heat quantity for a heating operation of the HVAC subsystem. The controller also includes a coefficient of performance (COP) calculation module configured to calculate a maximum COP of the HVAC subsystem in the heating mode. The controller also includes a heat recovery calculation module configured to calculate a maximum heat recovery quantity of the HVAC subsystem and a total sum of estimated heat recovery quantities recoverable from the plurality of heat sources. The controller also includes a power determination module configured to determine respective amounts of power input to the plurality of heat recovery drive components based on the total sum of estimated heat recovery quantities and the maximum heat recovery quantity.

The required heat quantity may include a passenger compartment-required heat quantity, which is required for heating a passenger compartment based on external environmental information and operation information of the HVAC subsystem.

The required heat quantity may include a passenger compartment-required heat quantity, which is required for heating a passenger compartment, and includes a battery-required heat quantity, which is required for warming up a battery.

The COP calculation module may be configured to calculate the maximum COP of the HVAC subsystem in the heating mode based on external environmental information and operation information of the HVAC subsystem.

The heat recovery calculation module may be configured to calculate the maximum heat recovery quantity of the HVAC subsystem based on the required heat quantity calculated by the required heat calculation module and the maximum COP of the HVAC subsystem calculated by the COP calculation module.

The heat recovery calculation module may be configured to calculate the total sum of estimated heat recovery quantities by calculating respective estimated heat recovery quantities of the heat sources based on operating conditions of the heat recovery drive components and states/conditions of the heat sources and by adding the estimated heat recovery quantities.

The heat recovery calculation module may be configured to calculate respective heat recovery efficiency of the heat recovery drive components based on the respective amounts of power supplied to the heat recovery drive components and the respective estimated heat recovery quantities of the corresponding heat sources.

The power determination module may be configured to determine the respective amounts of power input to the plurality of heat recovery drive components based on the total sum of estimated heat recovery quantities, the maximum heat recovery quantity, and the respective heat recovery efficiency of the heat recovery drive components.

The power determination module may reduce power supplied to at least one of the heat recovery drive components when the total sum of estimated heat recovery quantities is higher than or equal to the maximum heat recovery quantity.

The power determination module may reduce power supplied to a heat recovery drive component having a highest heat recovery efficiency among the heat recovery drive components when the total sum of estimated heat recovery quantities is higher than or equal to the maximum heat recovery quantity.

The power determination module may increase power supplied to at least one of the heat recovery drive components when the total sum of estimated heat recovery quantities is lower than the maximum heat recovery quantity.

The power determination module may increase power supplied to a heat recovery drive component having a highest heat recovery efficiency among the heat recovery drive components when the total sum of estimated heat recovery quantities is lower than the maximum heat recovery quantity.

The plurality of heat sources may include outdoor air, a power electronic component fluidly connected to the power electronics coolant circulation path, and indoor air of a passenger compartment.

The plurality of heat recovery drive components may include a power electronic pump fluidly connected to the power electronics coolant circulation path, a cooling fan adjacent to an exterior heat exchanger of the HVAC subsystem, and a switching door adjusting airflow between an indoor air passage and an outdoor air passage in an inlet duct of a blower case of the HVAC subsystem.

According to another aspect of the present disclosure, a method for controlling a vehicle thermal management system may include operating an HVAC subsystem in a heating mode and calculating a required heat quantity for a heating operation of the HVAC subsystem. The method may also include calculating a maximum heat recovery quantity of the HVAC subsystem and a total sum of estimated heat recovery quantities recoverable from a plurality of heat sources based on the required heat quantity and a maximum coefficient of performance (COP) of the HVAC subsystem in the heating mode. The method may also include determining respective amounts of power input to a plurality of heat recovery drive components based on the maximum heat recovery quantity of the HVAC subsystem and the total sum of estimated heat recovery quantities.

The method may further include calculating respective heat recovery efficiency of the heat recovery drive components based on the respective amounts of power supplied to the heat recovery drive components and the respective estimated heat recovery quantities of the corresponding heat sources. The method may further include adjusting and determining the respective amounts of power supplied to the plurality of heat recovery drive components based on the respective heat recovery efficiency of the heat recovery drive components.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
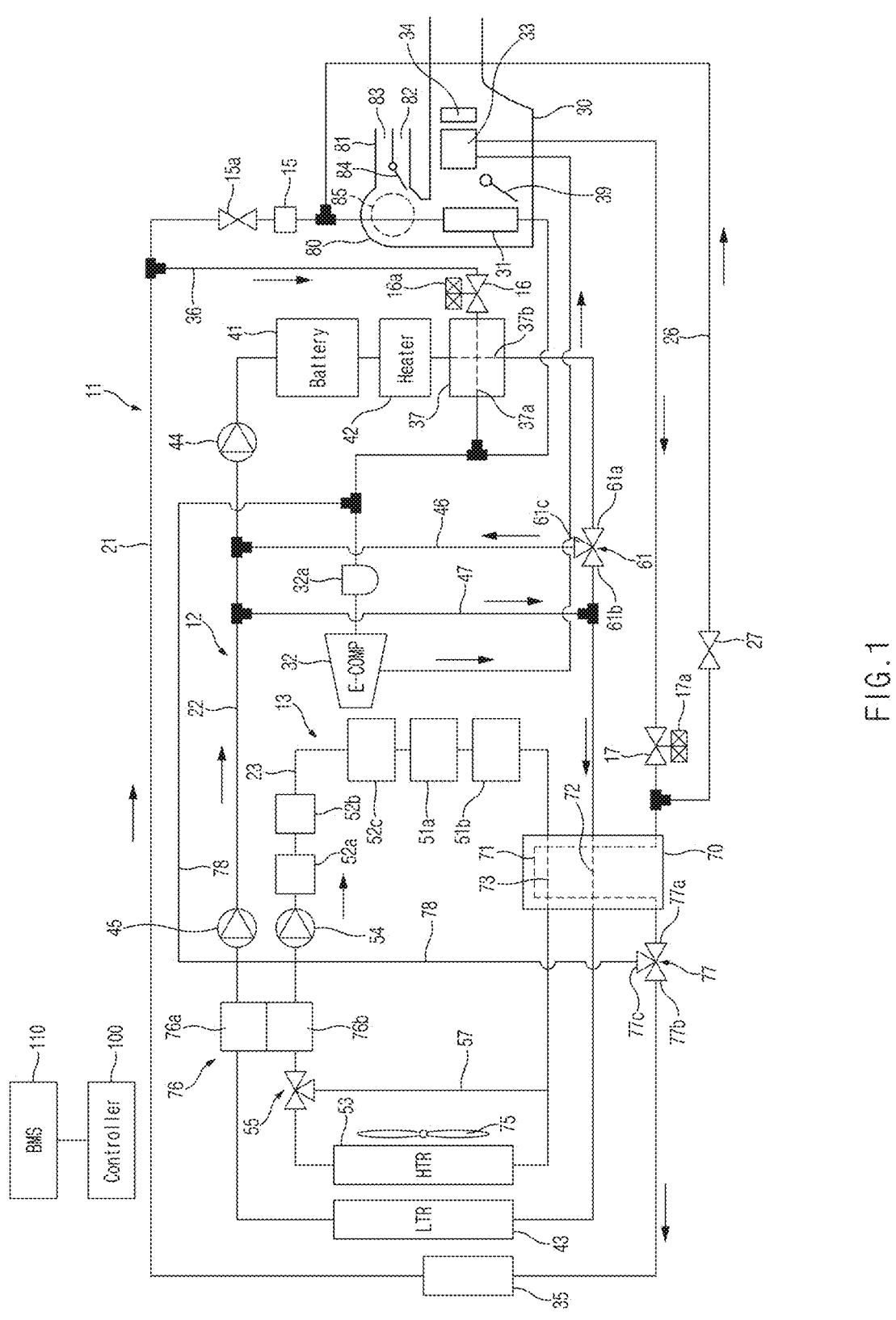
FIG. 1 illustrates a vehicle thermal management system according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure has been omitted in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those having ordinary skill in the art to which the present disclosure belongs. Such terms as those defined in a generally used dictionary should be interpreted as having meanings consistent with the contextual meanings in the relevant field of art and should not be interpreted as having ideal or excessively formal meanings unless clearly defined as having such in the present application.

Referring to FIG. 1, a vehicle thermal management system according to an embodiment of the present disclosure may include a heating, ventilation, and air conditioning (HVAC) subsystem 11 configured to heat or cool air in a passenger compartment of the vehicle. The system may also include a battery cooling subsystem 12 configured to cool a battery 41 and a power electronics cooling subsystem 13 configured to cool a plurality of power electronic components 51a, 51b, 52a, 52b, and 52c.

The vehicle thermal management system according to an embodiment of the present disclosure may include a water-cooled heat exchanger 70 configured to transfer heat between a refrigerant circulation path 21 of the HVAC subsystem 11, a battery coolant circulation path 22 of the battery cooling subsystem 12, and a power electronics coolant circulation path 23 of the power electronics cooling subsystem 13.

The HVAC subsystem 11 may include the refrigerant circulation path 21 through which a refrigerant circulates. The refrigerant circulation path 21 may be fluidly connected to an evaporator 31, a compressor 32, an interior condenser 33, a heating-side expansion valve 17, the water-cooled heat exchanger 70, an exterior heat exchanger 35, and a cooling-side expansion valve 15.

The evaporator 31 may be configured to cool the air using the refrigerant cooled by the exterior heat exchanger 35.

The compressor 32 may be configured to compress the refrigerant received from the evaporator 31 and/or a battery chiller 37. According to an embodiment, the compressor 32 may be an electric compressor driven by electric energy.

The interior condenser 33 may be configured to condense the refrigerant received from the compressor 32, and the air passing by an exterior surface of the interior condenser 33 may be heated by the interior condenser 33.

The water-cooled heat exchanger 70 may be configured to return waste heat of the power electronic components 51*a*, 51*b*, 52*a*, 52*b*, and 52*c* of the power electronics cooling subsystem 13 to the HVAC subsystem 11 and/or the battery cooling subsystem 12 during a heating operation of the HVAC subsystem 11. Specifically, the water-cooled heat exchanger 70 may include a first passage 71 fluidly connected to the refrigerant circulation path 21, a second passage 72 fluidly connected to the battery coolant circulation path 22, and a third passage 73 fluidly connected to the power electronics coolant circulation path 23.

The water-cooled heat exchanger 70 may be configured to transfer heat between the refrigerant circulation path 21 of the HVAC subsystem 11, the battery coolant circulation path 22 of the battery cooling subsystem 12, and the power electronics coolant circulation path 23 of the power electronics cooling subsystem 13. Accordingly, the refrigerant circulating in the refrigerant circulation path 21 may pass through the first passage 71 of the water-cooled heat exchanger 70. A battery coolant circulating in the battery coolant circulation path 22 of the battery cooling subsystem 12 may pass through the second passage 72 of the water-cooled heat exchanger 70. A power electronics coolant circulating in the power electronics coolant circulation path 23 of the power electronics cooling subsystem 13 may pass through the third passage 73 of the water-cooled heat exchanger 70. Thus, heat may be transferred between the refrigerant passing through the first passage 71, the battery coolant passing through the second passage 72, and/or the power electronics coolant passing through the third passage 73. Specifically, the first passage 71 of the water-cooled heat exchanger 70 may be disposed between the interior condenser 33 and the exterior heat exchanger 35 in the refrigerant circulation path 21.

The water-cooled heat exchanger 70 may be configured to evaporate the refrigerant expanded by the heating-side expansion valve 17 using the heat received from the battery cooling subsystem 12 and the power electronics cooling subsystem 13 during the heating operation of the HVAC subsystem 11. In other words, during the heating operation of the HVAC subsystem 11, the water-cooled heat exchanger 70 may serve as an evaporator that evaporates the refrigerant by recovering the waste heat generated from the battery cooling subsystem 12 and the power electronic components 51*a*, 51*b*, 52*a*, 52*b*, and 52*c* of the power electronics cooling subsystem 13.

The water-cooled heat exchanger 70 may be configured to condense the refrigerant received from the interior condenser 33 during the heating operation of the HVAC subsystem 11. The water-cooled heat exchanger 70 may serve as a condenser that condenses the refrigerant by cooling the refrigerant using the battery coolant circulating in the battery coolant circulation path 22 and the power electronics coolant circulating in the power electronics coolant circulation path 23.

The HVAC subsystem 11 may further include a heating bypass line 78 configured to allow the refrigerant discharged from the first passage 71 of the water-cooled heat exchanger 70 to be directed to the compressor 32. The heating bypass line 78 may be configured to connect a downstream point of the first passage 71 of the water-cooled heat exchanger 70 and an upstream point of the compressor 32. An inlet of the heating bypass line 78 may be fluidly connected to the refrigerant circulation path 21 at the downstream point of the first passage 71 of the water-cooled heat exchanger 70. Specifically, the inlet of the heating bypass line 78 may be fluidly connected to the refrigerant circulation path 21 at a point between an outlet of the first passage 71 of the water-cooled heat exchanger 70 and an inlet of the exterior heat exchanger 35. An outlet of the heating bypass line 78 may be fluidly connected to the refrigerant circulation path 21 at the upstream point of the compressor 32. Specifically, the outlet of the heating bypass line 78 may be fluidly connected to the refrigerant circulation path 21 at a point between an outlet of the evaporator 31 and an inlet of the compressor 32. In addition, the outlet of the heating bypass line 78 may be fluidly connected to the refrigerant circulation path 21 at an accumulator 32*a* or an upstream point of the accumulator 32*a*.

The heating bypass line 78 may allow the refrigerant evaporated by the water-cooled heat exchanger 70 to directly flow into the inlet of the compressor 32 during the heating operation of the HVAC subsystem 11.

The HVAC subsystem 11 may further include a three-way valve 77 configured to control the flow of the refrigerant in a manner that the refrigerant discharged from the first passage 71 of the water-cooled heat exchanger 70 is selectively directed to the exterior heat exchanger 35 and/or the heating bypass line 78.

The three-way valve 77 may be disposed at a point of connection between the inlet of the heating bypass line 78 and the refrigerant circulation path 21. The three-way valve 77 may include a first port 77*a* communicating with the first passage 71 of the water-cooled heat exchanger 70, a second port 77*b* communicating with the exterior heat exchanger 35, and a third port 77*c* communicating with the inlet of the heating bypass line 78. The three-way valve 77 may perform a switching operation which allows the first port 77*a* to selectively communicate with any one of the second port 77*b* and the third port 77*c*. For example, when the three-way valve 77 is switched to allow the third port 77*c* to communicate with the first port 77*a* (i.e., the three-way valve 77 opens the inlet of the heating bypass line 78), the refrigerant discharged from the first passage 71 of the water-cooled heat exchanger 70 may be directed to the compressor 32 through the heating bypass line 78. In other words, when the inlet of the heating bypass line 78 is opened by the switching of the three-way valve 77, the refrigerant may bypass the exterior heat exchanger 35. When the three-way valve 77 is switched to allow the second port 77*b* to communicate with the first port 77a (i.e., the three-way valve 77 closes the inlet of the heating bypass line 78), the refrigerant discharged from the first passage 71 of the water-cooled heat exchanger 70 may not pass through the heating bypass line 78 and may be directed to the exterior heat exchanger 35.

The heating-side expansion valve 17 may be disposed on the upstream side of the first passage 71 of the water-cooled heat exchanger 70 in the refrigerant circulation path 21. Specifically, the heating-side expansion valve 17 may be disposed between the interior condenser 33 and the water-cooled heat exchanger 70. The heating-side expansion valve 17 may adjust the flow of the refrigerant and/or the flow rate of the refrigerant into the first passage 71 of the water-cooled heat exchanger 70 during the heating operation of the HVAC subsystem 11. The heating-side expansion valve 17 may be configured to expand the refrigerant received from the interior condenser 33 during the heating operation of the HVAC subsystem 11.

The heating-side expansion valve 17 may be a full open type electronic expansion valve (EXV). Accordingly, the heating-side expansion valve 17 may be fully opened during a cooling operation of the HVAC subsystem 11 (i.e., the opening degree of the heating-side expansion valve 17 may be 100%). During the cooling operation of the HVAC subsystem 11, the refrigerant may not be expanded when passing through the heating-side expansion valve 17.

According to an embodiment, the heating-side expansion valve 17 may be an electronic expansion valve (EXV) having a drive motor 17a. The drive motor 17a may have a shaft, which is movable to open or close an orifice defined in a valve body of the heating-side expansion valve 17. The position of the shaft may be varied based on the rotation direction, rotation degree, and the like of the drive motor 17a, and accordingly the opening degree of the orifice of the heating-side expansion valve 17 may be varied. A controller 100 may control the operation of the drive motor 17a. The opening degree of the heating-side expansion valve 17 may be varied under control of the controller 100. As the opening degree of the heating-side expansion valve 17 is varied, the flow rate of the refrigerant into the first passage 71 of the water-cooled heat exchanger 70 may be varied. The heating-side expansion valve 17 may be controlled by the controller 100 during the heating operation of the HVAC subsystem 11.

The exterior heat exchanger 35 may be adjacent to a front grille of the vehicle, and the exterior heat exchanger 35 may be configured to condense the refrigerant received from the interior condenser 33. In particular, the exterior heat exchanger 35 may be configured to cool the refrigerant using outdoor air forcibly blown by a cooling fan 75 so that the refrigerant may be condensed.

The exterior heat exchanger 35 may be adjacent to the front grille of the vehicle, and the exterior heat exchanger 35 may be exposed to the outdoor air so that heat may be transferred between the exterior heat exchanger 35 and the outdoor air. An active air flap may be provided to open or close the front grille of the vehicle. In particular, the exterior heat exchanger 35 may exchange heat with the outdoor air forcibly blown by the cooling fan 75 so that a heat transfer rate between the exterior heat exchanger 35 and the outdoor air may be further increased. During the cooling operation of the HVAC subsystem 11, the exterior heat exchanger 35 may be configured to condense the refrigerant received from the interior condenser 33. In other words, the exterior heat exchanger 35 may serve as a condenser that condenses the refrigerant by transferring heat to the outdoor air during the cooling operation of the HVAC subsystem 11. During the heating operation of the HVAC subsystem 11, the exterior heat exchanger 35 may be configured to evaporate the refrigerant received from the first passage 71 of the water-cooled heat exchanger 70 using the outdoor air. In other words, the exterior heat exchanger 35 may serve as an evaporator that evaporates the refrigerant by absorbing heat from the outdoor air during the heating operation of the HVAC subsystem 11.

The cooling-side expansion valve 15 may be disposed between the exterior heat exchanger 35 and the evaporator 31 in the refrigerant circulation path 21. The cooling-side expansion valve 15 may be disposed on the upstream side of the evaporator 31 so that the cooling-side expansion valve 15 may adjust the flow of the refrigerant and/or the flow rate of the refrigerant into the evaporator 31. The cooling-side expansion valve 15 may be configured to expand the refrigerant received from the exterior heat exchanger 35. The cooling-side expansion valve 15 may be a thermal expansion valve (TXV), which senses the temperature and/or pressure of the refrigerant and adjusts the opening degree of the cooling-side expansion valve 15.

According to an embodiment of the present disclosure, the cooling-side expansion valve 15 may be a TXV having a shut-off valve 15a selectively blocking or unblocking the flow of the refrigerant into an internal passage of the cooling-side expansion valve 15, and the shut-off valve 15a may be a solenoid valve. As the controller 100 controls the shut-off valve 15a, the shut-off valve 15a may be opened or closed so that the shut-off valve 15a may unblock or block the flow of the refrigerant into the cooling-side expansion valve 15. When the shut-off valve 15a is opened, the refrigerant may be allowed to flow into the cooling-side expansion valve 15, and when the shut-off valve 15a is closed, the refrigerant may be blocked from flowing into the cooling-side expansion valve 15. According to an embodiment, the shut-off valve 15a may be mounted in a valve body of the cooling-side expansion valve 15 and thus open or close the internal passage of the cooling-side expansion valve 15. According to another embodiment, the shut-off valve 15a may be disposed on the upstream side of the cooling-side expansion valve 15 and thus selectively open or close an inlet of the cooling-side expansion valve 15.

When the shut-off valve 15a is closed, the cooling-side expansion valve 15 may be blocked, and accordingly the refrigerant may not be directed to the cooling-side expansion valve 15 and the evaporator 31 but may only be directed to the battery chiller 37. In other words, when the shut-off valve 15a is closed, the cooling operation of the HVAC subsystem 11 may not be performed. When the shut-off valve 15a is opened, the refrigerant may be directed to the cooling-side expansion valve 15 and the evaporator 31. In other words, when the shut-off valve 15a of the cooling-side expansion valve 15 is opened, the cooling operation of the HVAC subsystem 11 may be performed.

The HVAC subsystem 11 may include an HVAC case 30 configured to blow the air into the passenger compartment of the vehicle. The HVAC case 30 may have an inlet through which the air flows in, and an outlet through which the air is discharged to the passenger compartment.

The evaporator 31, the interior condenser 33, and an electric heater 34 may be located in the HVAC case 30. The evaporator 31, the interior condenser 33, and the electric heater 34 may be arranged sequentially from upstream to downstream in an air flow direction within the HVAC case 30. An air mixing door 39 may be disposed between the evaporator 31 and the interior condenser 33. The electric heater 34 may be disposed on the downstream side of the interior condenser 33 in the air flow direction, and the electric heater 34 may be a positive temperature coefficient (PTC) heater. The electric heater 34 may operate to provide assistance in heating the passenger compartment, thereby relatively increasing the temperature of the air blown into the passenger compartment.

The HVAC subsystem 11 may include a blower case 80 connected to the inlet of the HVAC case 30. A blower 85 may be received in the blower case 80, and the blower 85 may be located on the upstream side of the evaporator 31 in the air flow direction.

The blower case 80 may include an inlet duct 81 allowing the inflow of the indoor air and/or the outdoor air. In addition, the inlet duct 81 may include an indoor air passage 82 guiding the indoor air flow, an outdoor air passage 83 guiding the outdoor air flow, and a switching door 84 disposed between the indoor air passage 82 and the outdoor air passage 83. The indoor air passage 82 may communicate with the inside of the passenger compartment, and the outdoor air passage 83 may communicate with the outside of the passenger compartment or the outside of the vehicle. The switching door 84 may be activated by an actuator (not shown). The switching door 84 may be configured to adjust the air flow between the indoor air passage 82 and the outdoor air passage 83. The switching door 84 may be configured to move between an indoor-air circulation position, an outdoor-air intake position, and an intermediate opening position. When the switching door 84 is in the indoor-air circulation position, the switching door 84 may block the outdoor air from flowing through the outdoor air passage 83 and may allow only the indoor air to flow through the indoor air passage 82. When the switching door 84 is in the outdoor-air intake position, the switching door 84 may block the indoor air from flowing through the indoor air passage 82 and may allow only the outdoor air to flow through the outdoor air passage 83. When the switching door 84 is in the intermediate opening position, the switching door 84 may allow the indoor air to flow through the indoor air passage 82 and may allow the outdoor air to flow through the outdoor air passage 83. An indoor air fraction may be determined depending on the position of the switching door 84, and the indoor air fraction may be defined as a ratio of an indoor-air intake flow rate and a total supply air flow rate. In particular, the indoor air fraction may be defined as a percent of the indoor air flowing into the passenger compartment. When the switching door 84 is in the indoor-air circulation position, the opening degree of the indoor air passage 82 may be 100% and the opening degree of the outdoor air passage 83 may be 0%, and thus the indoor air fraction may be 100%. When the switching door 84 is in the outdoor-air intake position, the opening degree of the outdoor air passage 83 may be 100% and the opening degree of the indoor air passage 82 may be 0%, and thus the indoor air fraction may be 0%. When the switching door 84 is in the intermediate opening position, the indoor air fraction may be equal to or be proportional to the opening degree of the indoor air passage 82. When the switching door 84 is in the intermediate opening position, the opening degree of the indoor air passage 82 may exceed 0% or be less than 100% as the position of the switching door 84 is adjusted.

The HVAC subsystem 11 may further include the accumulator 32a disposed between the evaporator 31 and the compressor 32 in the refrigerant circulation path 21, and the accumulator 32a may be located on the downstream side of the evaporator 31. The accumulator 32a may separate a liquid refrigerant from the refrigerant received from the evaporator 31 and thus may prevent the liquid refrigerant from flowing into the compressor 32.

The HVAC subsystem 11 may further include a branch line 36 allowing the refrigerant discharged from the exterior heat exchanger 35 to be directed to the compressor 32. An inlet of the branch line 36 may be fluidly connected to the refrigerant circulation path 21 at an upstream point of the cooling-side expansion valve 15. Specifically, the inlet of the branch line 36 may be fluidly connected to the refrigerant circulation path 21 at a point between the exterior heat exchanger 35 and the cooling-side expansion valve 15. An outlet of the branch line 36 may be fluidly connected to the refrigerant circulation path 21 at an upstream point of the compressor 32. Specifically, the outlet of the branch line 36 may be fluidly connected to the refrigerant circulation path 21 at a point between the outlet of the evaporator 31 and the inlet of the compressor 32. In addition, the outlet of the branch line 36 may be fluidly connected to the refrigerant circulation path 21 at an upstream point of the accumulator 32a.

The HVAC subsystem 11 may include the battery chiller 37 fluidly connected to the branch line 36. The battery chiller 37 and the evaporator 31 may be fluidly connected in parallel to the compressor 32. The battery chiller 37 may be thermally connected to the battery cooling subsystem 12. The battery chiller 37 may be configured to transfer heat between the refrigerant passing through the branch line 36 and the coolant passing through the battery coolant circulation path 22. The battery chiller 37 may include a first passage 37a fluidly connected to the branch line 36 and may include a second passage 37b fluidly connected to the battery coolant circulation path 22. The first passage 37a and the second passage 37b may be adjacent to each other or contact each other in the battery chiller 37, and the first passage 37a may be fluidly separated from the second passage 37b. Accordingly, the battery chiller 37 may be configured to transfer heat between the coolant passing through the second passage 37b and the refrigerant passing through the first passage 37a.

A chiller-side expansion valve 16 may be disposed on the upstream side of the battery chiller 37 in the branch line 36. The chiller-side expansion valve 16 may adjust the flow of the refrigerant and/or the flow rate of the refrigerant into the battery chiller 37, and the chiller-side expansion valve 16 may be configured to expand the refrigerant received from the exterior heat exchanger 35.

According to an embodiment, the chiller-side expansion valve 16 may be an electronic expansion valve (EXV) having a drive motor 16a. The drive motor 16a may have a shaft, which is movable to open or close an internal passage defined in a valve body of the chiller-side expansion valve 16. The position of the shaft may be varied based on the rotation direction, rotation degree, and the like of the drive motor 16a, and accordingly the opening degree of the internal passage of the chiller-side expansion valve 16 may be varied. The controller 100 may control the operation of the drive motor 16a.

As the opening degree of the chiller-side expansion valve 16 is varied, the flow rate of the refrigerant into the battery chiller 37 may be varied. For example, when the opening degree of the chiller-side expansion valve 16 is greater than a reference opening degree, the flow rate of the refrigerant into the battery chiller 37 may be relatively increased above a reference flow rate. When the opening degree of the chiller-side expansion valve 16 is less than the reference opening degree, the flow rate of the refrigerant into the battery chiller 37 may be similar to the reference flow rate or be relatively lowered below the reference flow rate. Here, the reference opening degree refers to an opening degree of the chiller-side expansion valve 16 required for maintaining a target evaporator temperature, and the reference flow rate refers to a flow rate of the refrigerant into the battery chiller 37 when the chiller-side expansion valve 16 is opened to the reference opening degree. Accordingly, when the chiller-side expansion valve 16 is opened to the reference opening degree, the refrigerant may flow into the battery chiller 37 at the corresponding reference flow rate.

As the opening degree of the cooling-side expansion valve 15 and the opening degree of the chiller-side expansion valve 16 are adjusted by the controller 100, the refrigerant may be distributed to the evaporator 31 and the battery chiller 37 at a predetermined ratio, and accordingly the cooling of the HVAC subsystem 11 and the cooling of the battery chiller 37 may be performed simultaneously or selectively. The controller 100 may be configured to control respective operations of the cooling-side expansion valve 15, the chiller-side expansion valve 16, the compressor 32, and the like of the HVAC subsystem 11, and thus the overall operation of the HVAC subsystem 11 may be controlled by the controller 100.

The HVAC subsystem 11 may further include a dehumidification bypass line 26 configured to allow at least a portion of the refrigerant discharged from the heating-side expansion valve 17 to be directed to the evaporator 31. An inlet of the dehumidification bypass line 26 may be fluidly connected to the refrigerant circulation path 21 at a point between the heating-side expansion valve 17 and the first passage 71 of the water-cooled heat exchanger 70. An outlet of the dehumidification bypass line 26 may be fluidly connected to the refrigerant circulation path 21 at an upstream point of the evaporator 31. A shut-off valve 27 may be provided to open or close the dehumidification bypass line 26. When dehumidification in the passenger compartment is required during the heating operation of the HVAC subsystem 11, the shut-off valve 27 may be opened so that at least a portion of the refrigerant flowing from the heating-side expansion valve 17 to the first passage 71 of the water-cooled heat exchanger 70 may be directed to the evaporator 31 through the dehumidification bypass line 26. Accordingly, the refrigerant directed to the evaporator 31 may absorb heat from the air passing by an exterior surface of the evaporator 31, and thus the heating and dehumidification of the passenger compartment may be performed simultaneously.

The battery cooling subsystem 12 may include the battery coolant circulation path 22 through which the battery coolant circulates. The battery coolant circulation path 22 may be fluidly connected to the battery 41, a battery heater 42, the battery chiller 37, the second passage 72 of the water-cooled heat exchanger 70, a battery radiator 43, a battery reservoir 76a, a second battery pump 45, and a first battery pump 44. In FIG. 1, the coolant may sequentially pass through the battery 41, the battery heater 42, the battery chiller 37, the second passage 72 of the water-cooled heat exchanger 70, the battery radiator 43, the battery reservoir 76a, the second battery pump 45, and the first battery pump 44 in the battery coolant circulation path 22.

The battery 41 may have a coolant passage provided inside or outside thereof, and the battery coolant may pass through the coolant passage. The battery coolant circulation path 22 may be fluidly connected to the coolant passage of the battery 41.

The battery heater 42 may be disposed between the battery chiller 37 and the battery 41, and the battery heater 42 may have an internal passage fluidly connected to the battery coolant circulation path 22. The battery heater 42 may be configured to heat the battery coolant passing through the internal passage thereof. According to an embodiment, the battery heater 42 may be an electric heater. In order to keep the temperature of the battery 41 at an optimal operating temperature, when the warm-up of the battery 41 is required, the battery heater 42 may operate so that the battery coolant may be heated. The heated battery coolant may pass through the coolant passage of the battery 41 so that the temperature of the battery 41 may be increased to the optimal operating temperature.

The battery radiator 43 may be adjacent to the front grille of the vehicle, and the battery radiator 43 may be cooled using the outdoor air forcibly blown by the cooling fan 75. The battery radiator 43 may be adjacent to the exterior heat exchanger 35.

The first battery pump 44 may be configured to allow the coolant to circulate through the battery coolant circulation path 22. The first battery pump 44 may be located at an upstream point of the battery 41. Specifically, the first battery pump 44 may be fluidly connected to the battery coolant circulation path 22 at a point adjacent to an inlet of the battery 41.

The second battery pump 45 may be configured to allow the coolant to circulate through the battery coolant circulation path 22. The second battery pump 45 may be located at a downstream point of the battery radiator 43. Specifically, the second battery pump 45 may be fluidly connected to the battery coolant circulation path 22 at a point adjacent to an outlet of the battery radiator 43.

The battery cooling subsystem 12 may include a battery reservoir 76a located at a downstream point of the battery radiator 43. The battery reservoir 76a may be located between the battery radiator 43 and the second battery pump 45. The battery reservoir 76a may temporarily store and replenish the battery coolant so that the flow rate of the battery coolant circulating in the battery coolant circulation path 22 may be constantly maintained.

The battery cooling subsystem 12 may further include a first battery bypass line 46 allowing the battery coolant to bypass the battery radiator 43. The first battery bypass line 46 may be configured to directly connect a downstream point of the battery radiator 43 and an upstream point of the battery radiator 43 in the battery coolant circulation path 22.

An inlet of the first battery bypass line 46 may be fluidly connected to the battery coolant circulation path 22 at a point between the second passage 37b of the battery chiller 37 and the battery radiator 43. Specifically, the inlet of the first battery bypass line 46 may be fluidly connected to the battery coolant circulation path 22 at a point between second passage 37b of the battery chiller 37 and the second passage 72 of the water-cooled heat exchanger 70.

An outlet of the first battery bypass line 46 may be fluidly connected to the battery coolant circulation path 22 at a point between the battery 41 and the battery radiator 43. Specifically, the outlet of the first battery bypass line 46 may be fluidly connected to the battery coolant circulation path 22 at a point between an inlet of the first battery pump 44 and an outlet of the battery reservoir 76a.

As the battery coolant flows from the downstream side of the battery chiller 37 to the upstream side of the first battery pump 44 through the first battery bypass line 46, the battery coolant may be allowed to bypass the second battery pump 45, the battery radiator 43, the battery reservoir 76a, and the second passage 72 of the water-cooled heat exchanger 70. Accordingly, the battery coolant passing through the first battery bypass line 46 may sequentially pass through the battery 41, the battery heater 42, and the battery chiller 37 by the first battery pump 44.

The battery cooling subsystem 12 may further include a second battery bypass line 47 allowing the battery coolant to bypass the first battery pump 44, the battery 41, the battery heater 42, and the battery chiller 37. The second battery bypass line 47 may be configured to directly connect a downstream point of the battery chiller 37 and an upstream point of the battery 41 in the battery coolant circulation path 22.

An inlet of the second battery bypass line 47 may be fluidly connected to the battery coolant circulation path 22 at a point between the outlet of the first battery bypass line 46 and the outlet of the battery radiator 43. Specifically, the inlet of the second battery bypass line 47 may be fluidly connected to the battery coolant circulation path 22 at a point between the outlet of the first battery bypass line 46 and an outlet of the second battery pump 45.

An outlet of the second battery bypass line 47 may be fluidly connected to the battery coolant circulation path 22 at a point between the inlet of the first battery bypass line 46 and an inlet of the battery radiator 43. Specifically, the outlet of the second battery bypass line 47 may be fluidly connected to the battery coolant circulation path 22 at a point between the inlet of the first battery bypass line 46 and an inlet of the second passage 72 of the water-cooled heat exchanger 70.

As the battery coolant is directed to the battery radiator 43 through the second battery bypass line 47 by the second battery pump 45, the battery coolant may be allowed to bypass the battery 41, the battery heater 42, and the battery chiller 37. Accordingly, the battery coolant passing through the second battery bypass line 47 may sequentially pass through the second passage 72 of the water-cooled heat exchanger 70, the battery radiator 43, and the battery reservoir 76a by the second battery pump 45.

The first battery bypass line 46 and the second battery bypass line 47 may be parallel to each other.

The battery cooling subsystem 12 may further include a three-way valve 61 disposed at the inlet of the first battery bypass line 46. In other words, the three-way valve 61 may be disposed at a junction between the inlet of the first battery bypass line 46 and the battery coolant circulation path 22. The three-way valve 61 may include a first port 61a fluidly connected to the battery chiller 37, a second port 61b fluidly connected to the second passage 72 of the water-cooled heat exchanger 70, and a third port 61c fluidly connected to the first battery bypass line 46. The three-way valve 61 may perform a switching operation, which allows at least two of the first port 61a, the second port 61b, and the third port 61c to selectively communicate with each other. The first battery pump 44 and the second battery pump 45 may selectively operate according to the switching operation of the three-way valve 61.

When the three-way valve 61 is switched to allow the second port 61b to communicate with the first port 61a (i.e., the three-way valve 61 is switched to close the inlet of the first battery bypass line 46), the battery coolant may not pass through the first battery bypass line 46 and the second battery bypass line 47 and may sequentially pass through the battery 41, the battery heater 42, the battery chiller 37, the second passage 72 of the water-cooled heat exchanger 70, and the battery radiator 43.

When the three-way valve 61 is switched to allow the third port 61c to communicate with the first port 61a (i.e., the three-way valve 61 is switched to open the inlet of the first battery bypass line 46), a portion of the battery coolant may pass through the first battery bypass line 46 so that the portion of the battery may bypass the second battery pump 45, the second passage 72 of the water-cooled heat exchanger 70, and the battery radiator 43 and may sequentially pass through the battery 41, the battery heater 42, and the battery chiller 37 by the first battery pump 44. A remaining portion of the battery coolant may pass through the second battery bypass line 47 so that the remaining portion of the battery coolant may bypass the first battery pump 44, the battery 41, the battery heater 42, and the battery chiller 37 and may sequentially pass through the second passage 72 of the water-cooled heat exchanger 70 and the battery radiator 43 by the second battery pump 45.

As described above, the three-way valve 61 may be configured to adjust the flow of the battery coolant in the battery coolant circulation path 22, and the first battery pump 44 and the second battery pump 45 may selectively operate according to the switching operation of the three-way valve 61.

The battery cooling subsystem 12 may be controlled by a battery management system (BMS) 110 and the controller 100. The battery management system 110 may monitor the state of the battery 41 and may perform the cooling of the battery 41 when the temperature of the battery 41 is higher than or equal to a threshold temperature. The battery management system 110 may transmit an instruction for the cooling of the battery 41 to the controller 100, and accordingly the controller 100 may control the compressor 32 to operate and control the chiller-side expansion valve 16 to open. When the operation of the HVAC system 11 is not required during the cooling operation of the battery 41, the controller 100 may control the cooling-side expansion valve 15 to close. In addition, the battery management system 110 may control the operation of the first battery pump 44 and the switching operation of the three-way valve 61 so that the battery coolant may be allowed to bypass the battery radiator 43 and pass through the battery 41 and the battery chiller 37 as necessary.

The power electronics cooling subsystem 13 may be configured to cool the plurality of power electronic components 51a, 51b, 52a, 52b, and 52c using the power electronics coolant circulating in the power electronics coolant circulation path 23.

The power electronics cooling subsystem 13 may include the power electronics coolant circulation path 23 through which the power electronics coolant circulates. The power electronics coolant circulation path 23 may be fluidly connected to the plurality of power electronic components 51a, 51b, 52a, 52b, and 52c, a power electronic radiator 53, a power electronic pump 54, and a power electronic reservoir 76b.

According to an embodiment, the plurality of power electronic components may include a front-wheel-side electric motor 51a driving front wheels, a rear-wheel-side electric motor 51b driving rear wheels, a front-wheel-side inverter 52a controlling the speed and direction of the front-wheel-side electric motor 51a, an integrated charging control unit (ICCU) 52b charging a high-voltage battery and a secondary battery of an electric vehicle, and a rear-wheel-side inverter 52c controlling the speed and direction of the rear-wheel-side electric motor 51b.

Each of the electric motors 51a and 51b may have a coolant passage provided inside or outside thereof, and the coolant may pass through the coolant passage. The power electronics coolant circulation path 23 may be fluidly connected to the coolant passage of each of the electric motors 51a and 51b.

Each of the electronic components 52a, 52b, and 52c may have a coolant passage provided inside or outside thereof, and the coolant may pass through the coolant passage. The power electronics coolant circulation path 23 may be fluidly connected to the coolant passage of each of the electronic components 52a, 52b, and 52c.

The power electronic radiator 53 may be adjacent to the front grille of the vehicle, and the power electronic radiator 53 may be cooled using the outdoor air forcibly blown by the cooling fan 75. The exterior heat exchanger 35, the battery radiator 43, and the power electronic radiator 53 may be disposed adjacent to each other on the front of the vehicle, and the cooling fan 75 may be disposed behind the exterior heat exchanger 35, the battery radiator 43, and the power electronic radiator 53.

The power electronic pump 54 may be disposed on the upstream side of the electric motors 51a and 51b and the electronic components 52a, 52b, and 52c, and the power electronic pump 54 may allow the coolant to circulate in the power electronics coolant circulation path 23. The operation of the power electronic pump 54 may be controlled by the controller 100. The power electronic reservoir 76b may be disposed on the downstream side of the power electronic radiator 53. In particular, the power electronic reservoir 76b may be disposed between the power electronic radiator 53 and the power electronic pump 54 in the power electronics coolant circulation path 23.

The power electronics cooling subsystem 13 may further include a power electronic bypass line 57 allowing the power electronics coolant discharged from the third passage 73 of the water-cooled heat exchanger 70 to bypass the power electronic radiator 53 and be directed to the power electronic components 52a, 52b, 52c, 51a, and 51b. The power electronic bypass line 57 may be configured to directly connect an upstream point of the power electronic radiator 53 and a downstream point of the power electronic radiator 53 in the power electronics coolant circulation path 23. An inlet of the power electronic bypass line 57 may be fluidly connected to the power electronics coolant circulation path 23 at a point between the third passage 73 of the water-cooled heat exchanger 70 and an inlet of the power electronic radiator 53. An outlet of the power electronic bypass line 57 may be fluidly connected to the power electronics coolant circulation path 23 at a point between an outlet of the power electronic radiator 53 and the power electronic reservoir 76b.

The power electronics cooling subsystem 13 may include a three-way valve 55 disposed at the outlet of the power electronic bypass line 57. The three-way valve 55 may be disposed at a junction between the outlet of the power electronic bypass line 57 and the power electronics coolant circulation path 23. When the three-way valve 55 is switched to close the outlet of the power electronic bypass line 57, the power electronics coolant may not pass through the power electronic bypass line 57 and may sequentially pass through the power electronic components 52a, 52b, 52c, 51a, and 51b, the third passage 73 of the water-cooled heat exchanger 70, the power electronic radiator 53, and the power electronic reservoir 76b. When the three-way valve 55 is switched to open the outlet of the power electronic bypass line 57, the power electronics coolant may pass through the power electronic bypass line 57 so that the power electronics coolant may bypass the power electronic radiator 53 and may sequentially pass through the power electronic components 52a, 52b, 52c, 51a, and 51b, the third passage 73 of the water-cooled heat exchanger 70, and the power electronic reservoir 76b. The three-way valve 55 may adjust the flow of the power electronics coolant in the power electronics coolant circulation path 23.

According to an embodiment, the battery reservoir 76a and the power electronic reservoir 76b may be joined to form an integrated reservoir 76, and the battery reservoir 76a and the power electronic reservoir 76b may be fluidly separated from each other by a partition or the like.

According to another embodiment, the battery reservoir 76a and the power electronic reservoir 76b may be fluidly connected to each other in the integrated reservoir 76, and accordingly the battery coolant and the power electronics coolant may be mixed in the integrated reservoir 76.

The vehicle thermal management system according to an embodiment of the present disclosure may include an outdoor air temperature sensor measuring the outdoor air temperature of the vehicle, a coolant temperature sensor measuring the temperature of the coolant circulating in the power electronics coolant circulation path, a refrigerant pressure/temperature sensor measuring the pressure and temperature of the low-pressure refrigerant, an evaporator temperature sensor provided adjacent to the evaporator, and an indoor temperature sensor measuring the indoor temperature of the passenger compartment.

The outdoor air temperature sensor may be adjacent to the front grille of the vehicle so that the outdoor air temperature sensor may measure the outdoor air temperature of the vehicle. The outdoor air temperature measured by the outdoor air temperature sensor may be used for optimal control of the HVAC subsystem 11, the battery cooling subsystem 12, and the power electronics cooling subsystem 13.

The coolant temperature sensor may be provided on the power electronics coolant circulation path 23 and may measure the temperature of the coolant circulating in the power electronics coolant circulation path 23. The temperature of the coolant measured by the coolant temperature sensor may be used for optimal control of the HVAC subsystem 11 and the power electronics cooling subsystem 13.

The refrigerant pressure/temperature sensor may be located on the downstream side of the battery chiller 37 and may measure the pressure and temperature of the low-pressure refrigerant expanded by the chiller-side expansion valve 16. The pressure and temperature of the refrigerant measured by the refrigerant pressure/temperature sensor may be used for optimal control of the HVAC subsystem 11 and the battery cooling subsystem 12.

The evaporator temperature sensor may be provided on the exterior surface of the evaporator 31 or be adjacent to the evaporator 31, and the evaporator temperature sensor may measure the temperature of the evaporator 31 and the temperature of the air passing by the exterior surface of the evaporator 31. The temperature of the evaporator 31 and the temperature of the air passing by the exterior surface of the evaporator 31 measured by the evaporator temperature sensor may be used for optimal control of the HVAC subsystem 11 and the battery cooling subsystem 12.

The indoor temperature sensor may be provided in the passenger compartment and may measure the indoor temperature of compartment. The indoor temperature of the passenger passenger compartment measured by the indoor temperature sensor may be used for optimal control of the HVAC subsystem 11 and the battery cooling subsystem 12.

The controller 100 may appropriately control the operations of the HVAC subsystem 11, the battery cooling subsystem 12, and the power electronics cooling subsystem 13 using information received from various sensors, such as the outdoor air temperature sensor, the coolant temperature sensor, the refrigerant pressure/temperature sensor, the evaporator temperature sensor, and the indoor temperature sensor. For example, the controller 100 may control the operations of the shut-off valve 15a of the cooling-side expansion valve 15, the electric heater 34, the air mixing door 39, the compressor 32, the cooling fan 75, the drive motor 16a of the chiller-side expansion valve 16, the drive motor 17a of the heating-side expansion valve 17, the first battery pump 44, the second battery pump 45, the power electronic pump 54, the three-way valves 55, 61, and 77, and the like. Thus, the cooling and heating of the passenger compartment, the cooling of the battery 41, and the cooling of the power electronic components 51a, 51b, 52a, 52b, and 52c may be appropriately performed. According to an embodiment, the controller 100 may be a fully automatic temperature control (FATC) system or a dual automatic temperature control (DATC) system.

The controller 100 may include a processor and a memory. The processor may be programmed to receive instructions stored in the memory and may transmit instructions to the HVAC subsystem 11, the battery cooling subsystem 12, and the power electronics cooling subsystem 13. The memory may be a data storage, such as a hard disk drive, a solid state drive, a server, a volatile storage medium, and a non-volatile storage medium.

When the HVAC subsystem 11 operates in a heating mode to heat the passenger compartment, the shut-off valve 15a of the cooling-side expansion valve 15 may be closed, and the heating-side expansion valve 17 may be opened to a predetermined opening degree. The refrigerant compressed by the compressor 32 may be condensed in the interior condenser 33, and the refrigerant condensed by the interior condenser 33 may be expanded in the heating-side expansion valve 17. The expanded refrigerant may be evaporated in the water-cooled heat exchanger 70 and the exterior heat exchanger 35 and then may be directed to the compressor 32. In other words, the refrigerant may sequentially pass through the compressor 32, the interior condenser 33, the heating-side expansion valve 17, the water-cooled heat exchanger 70, and the exterior heat exchanger 35. The air passing by the exterior surface of the interior condenser 33 may be heated by the refrigerant passing through an internal passage of the interior condenser 33, and the heated air may be discharged into the passenger compartment through the outlet of the HVAC case 30 so that the heating of the passenger compartment may be performed.

When heat (waste heat) generated from the power electronic components 51a, 51b, 52a, 52b, and 52c is relatively high, the temperature of the power electronics coolant discharged from the coolant passage of each of the power electronic components 51a, 51b, 52a, 52b, and 52c may be higher than or equal to a threshold temperature. In this condition, when the refrigerant passes through the first passage 71 of the water-cooled heat exchanger 70, and the power electronics coolant passes through the third passage 73 of the water-cooled heat exchanger 70, the refrigerant may absorb the heat from the power electronics coolant so that the refrigerant may be evaporated, and the power electronics coolant may be cooled. Here, the threshold temperature refers to a temperature of the power electronics coolant at which the refrigerant is sufficiently evaporated by the power electronics coolant. As the revolutions per minute (RPM) of the power electronic pump 54 is adjusted by the controller 100, the flow rate of the power electronics coolant into the third passage 73 of the water-cooled heat exchanger 70 may be adjusted. Accordingly, the quantity of heat absorbed or recovered from the power electronics coolant by the refrigerant in the water-cooled heat exchanger 70 may be adjusted.

In a condition in which the temperature of the outdoor air flowing in through the front grille of the vehicle is higher than the temperature of the refrigerant passing through an internal passage of the exterior heat exchanger 35, when the refrigerant passes through the exterior heat exchanger 35, and the outdoor air passes by an exterior surface of the exterior heat exchanger 35, the refrigerant may absorb or recover heat from the outdoor air so that the refrigerant may be evaporated, and the outdoor air may be cooled. The outdoor air may be blown to the exterior heat exchanger 35 by the cooling fan 75. As the RPM of the cooling fan 75 is adjusted by the controller 100, the flow rate of the outdoor air blown to the exterior heat exchanger 35 may be adjusted, and accordingly the quantity of heat absorbed or recovered from the outdoor air by the refrigerant in the exterior heat exchanger 35 may be adjusted.

When the HVAC subsystem 11 operates in the heating mode, the HVAC subsystem 11 may absorb or recover heat from the indoor air of the passenger compartment based on the position of the switching door 84 moving in the inlet duct 81 of the blower case 80.

As described above, the vehicle thermal management system may include a plurality of heat sources from which the HVAC subsystem 11 may absorb or recover heat when the HVAC subsystem 11 operates in the heating mode. The plurality of heat sources may include the outdoor air, the power electronic components 51a, 51b, 52a, 52b, and 52c, and the indoor air of the passenger compartment.

In addition, the vehicle thermal management system may include a plurality of heat recovery drive components allowing the HVAC subsystem 11 to absorb or recover heat from the plurality of heat sources when the HVAC subsystem 11 operates in the heating mode. The plurality of heat recovery drive components may include the power electronic pump 54, the cooling fan 75, and the switching door 84 provided in the inlet duct 81 of the blower case 80.

According to an embodiment, a first heat recovery drive component may be the power electronic pump 54 allowing the power electronics coolant to pass through the third passage 73 of the water-cooled heat exchanger 70. The RPM of the power electronic pump 54 corresponding to power supplied to the power electronic pump 54 may be determined, and the flow rate of the power electronics coolant passing through the third passage 73 of the water-cooled heat exchanger 70 may be determined. Accordingly, the quantity of heat recovered from the waste heat of the power electronic components by the refrigerant of the HVAC subsystem 11 may be determined.

According to an embodiment, a second heat recovery drive component may be the cooling fan 75 forcibly blowing the outdoor air to the exterior heat exchanger 35. The RPM of the cooling fan 75 corresponding to power supplied to the cooling fan 75 may be determined, and the flow rate of the outdoor air passing by the exterior surface of the exterior heat exchanger 35 may be determined. Accordingly, the quantity of heat recovered from the outdoor air by the refrigerant of the HVAC subsystem 11 may be determined.

According to an embodiment, a third heat recovery drive component may be the switching door 84 provided in the inlet duct 81 of the blower case 80. The position of the switching door 84 corresponding to power supplied to the switching door 84 may be determined. An indoor air intake flow rate (an airflow rate of the indoor air of the passenger compartment recirculated in the passenger compartment through the HVAC case 30) may be determined. Accordingly, the quantity of heat recovered from the indoor air of the passenger compartment may be determined.

Figure 2:
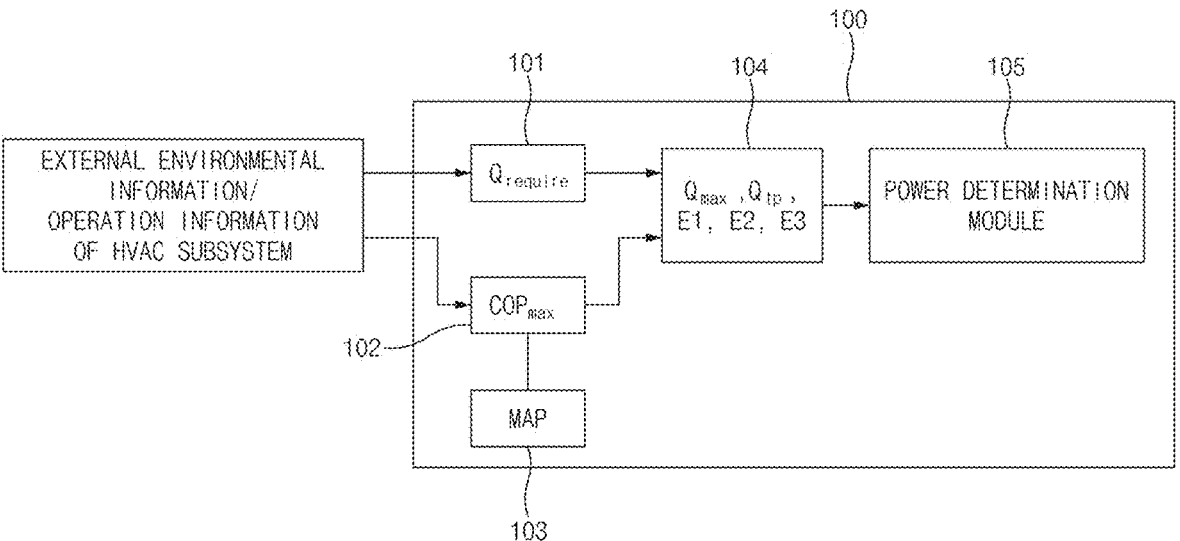
FIG. 2 illustrates a controller of a vehicle thermal management system according to an embodiment of the present disclosure.

Referring to FIG. 2, the controller 100 may include a required heat calculation module 101 configured to calculate a quantity of heat $Q_{require}$ required for the heating operation of the HVAC subsystem 11 when the HVAC subsystem 11 operates in the heating mode.

The required heat calculation module 101 may be configured to calculate the required heat quantity $Q_{require}$ based external environmental on information and the operation information of the HVAC subsystem 11. The external environmental information may include an outdoor temperature, a solar radiation quantity, and the like. The operation information of the HVAC subsystem 11 may include the operating conditions of the compressor 32, the operating conditions of the electric heater 34, the ambient temperature of the evaporator 31 (the inlet-side temperature of the HVAC case 30), the operating conditions of the blower of the HVAC subsystem 11, a target warm-up temperature of the passenger compartment, and the like.

According to an embodiment, the required heat quantity $Q_{require}$ may include a passenger compartment-required heat quantity $Q_{cabin}$, which is required for heating the passenger compartment based on the external environmental information and the operation information of the HVAC subsystem 11.

The required heat calculation module 101 may be configured to calculate the passenger compartment-required heat quantity $Q_{cabin}$ based on an airflow rate supplied to the passenger compartment through the HVAC case 30 and the inlet-side temperature and outlet-side temperature of the HVAC case 30. Specifically, the required heat calculation module 101 may calculate the passenger compartment-required heat quantity $Q_{cabin}$ based on an airflow rate FA of the air passing through the HVAC case 30, an inlet-side temperature $T_{inlet}$ of the HVAC case 30, an outlet-side temperature $T_{outlet}$ of the HVAC case 30, static pressure $C_p$ of the air, and density d of the air ($Q_{cabin}=C_p \times d \times FA \times (T_{inlet}-T_{outlet})$). The inlet-side temperature $T_{inlet}$ of the HVAC case 30 may be measured by the temperature sensor disposed on or adjacent to the evaporator 31, and the outlet-side temperature $T_{outlet}$ of the HVAC case 30 may be measured by the indoor temperature sensor disposed in the passenger compartment.

According to another embodiment, the required heat quantity $Q_{require}$ may include the passenger compartment-required heat quantity $Q_{cabin}$ required for heating the passenger compartment and may include a battery-required heat quantity $Q_{battery}$ required for warming-up the battery. The required heat calculation module 101 may receive the battery-required heat quantity $Q_{battery}$ from the battery management system 110 and may add the battery-required heat quantity $Q_{battery}$ and the passenger compartment-required heat quantity $Q_{cabin}$ so that the required heat calculation module 101 may be configured to calculate the required heat quantity ($Q_{require}=Q_{cabin}+Q_{battery}$) required for the heating operation of the HVAC subsystem 11.

Referring to FIG. 2, the controller 100 may include a coefficient of performance (COP) calculation module 102 configured to calculate a maximum COP $COP_{max}$ of the HVAC subsystem 11 in the heating mode based on the external environmental information and the operation information of the HVAC subsystem 11.

The COP calculation module 102 may be configured to calculate the maximum COP $COP_{max}$ of the HVAC subsystem 11 in the heating mode using a temperature $T_{hot}$ of a hot reservoir and a temperature Told of a cold reservoir ($COP_{max}=T_{hot}/(T_{hot}-T_{cold})$). The temperature $T_{hot}$ of the hot reservoir may be the indoor temperature of the passenger compartment or the temperature of the air heated by the interior condenser 33. The temperature $T_{cold}$ of the cold reservoir may be the outdoor temperature of the vehicle or the temperature of the air passing by the exterior surface of the evaporator 31 (the inlet-side temperature of the HVAC case 30).

According to an embodiment, the COP calculation module 102 may calculate the maximum COP of the HVAC subsystem 11 based on a COP map 103 including various factors (the outdoor temperature, the operating conditions of the blower, vehicle speed, the heat generating amounts of the power electronic components, the temperature of the power electronics coolant, the RPM of the power electronic pump, and the like).

Referring to FIG. 2, the controller 100 may include a heat recovery calculation module 104 configured to calculate a maximum heat recovery quantity $Q_{max}$ of the HVAC subsystem 11 and a total sum $Q_{tp}$ of estimated heat recovery quantities recoverable from the plurality of heat sources (total heat that may potentially be recovered) when the HVAC subsystem 11 operates in the heating mode.

The heat recovery calculation module 104 may calculate the maximum heat recovery quantity $Q_{max}$ of the HVAC subsystem 11 based on the required heat quantity $Q_{require}$ calculated by the required heat calculation module 101 and the maximum COP $COP_{max}$ Of the HVAC subsystem 11 calculated by the COP calculation module 102 ($Q_{max}=Q_{require} \times (1-1/COP_{max})$).

The heat recovery calculation module 104 may calculate the total sum of estimated heat recovery quantities by calculating the respective estimated heat recovery quantities of the heat sources based on the operating conditions of the heat recovery drive components 54, 75, and 84 and the states/conditions of the heat sources (the power electronic components, the outdoor air, and the indoor air of the passenger compartment) and by adding the plurality of estimated heat recovery quantities.

In addition, the heat recovery calculation module 104 may calculate respective heat recovery efficiency E1, E2, and E3 of the heat recovery drive components 54, 75, and 84 based on the amounts of power supplied to the heat recovery drive components and the respective estimated heat recovery quantities of the corresponding heat sources.

According to an embodiment, an estimated heat recovery quantity $Q_a$ recoverable from the outdoor air may be calculated based on specific heat $C_{pa}$ of the outdoor air, an airflow rate FA1 made by the cooling fan 75, a temperature $T_a$ of the outdoor air, and a temperature $T_r$ of the refrigerant flowing into the inlet of the exterior heat exchanger 35 ($Q_a=C_{pa} \times FA1 \times (T_a-T_r)$). The temperature $T_r$ of the refrigerant flowing into the inlet of the exterior heat exchanger 35 may be a saturated temperature of the refrigerant in a low pressure condition, which is the lowest temperature of the refrigerant.

According to an embodiment, an estimated heat recovery quantity $Q_m$ recoverable from the electric motors 51a and 51b among the power electronic components may be calculated based on a torque $M_t$ of the electric motor, the RPM $M_r$ of the electric motor, and inefficiency $(1-M_e)$ of the electric motor ($Q_m=M_t \times M_r \times (1-M_e)$), and the inefficiency $(1-M_e)$ of the electric motor may be obtained by subtracting efficiency $M_e$ of the electric motor from 1. An estimated heat recovery quantity $Q_i$ recoverable from the inverters 52a and 52c among the power electronic components may be calculated based on power $I_p$ input to the inverter and inefficiency $(1-I_e)$ of the inverter $(Q_i=I_p\times(1-I_e))$, and the inefficiency $(1-I_e)$ of the inverter may be obtained by subtracting efficiency $I_e$ of the inverter from 1.

According to an embodiment, an estimated heat recovery quantity $Q_{in}$ recoverable from the indoor air, which is recirculated from the passenger compartment to the inlet of the HVAC case 30, may be calculated based on specific heat $C_{pi}$ of the indoor air, an airflow rate FA2 of the indoor air flowing into the passenger compartment, a temperature $T_c$ of the indoor air of the passenger compartment, and a temperature $T_a$ of the outdoor air $(Q_{in}=C_{pi}\times FA2\times(T_c-T_a))$.

Referring to FIG. 2, the controller 100 may include a power determination module 105 configured to determine respective amounts of power input to the plurality of heat recovery drive components 54, 75, and 84 based on the total sum $Q_{tp}$ of estimated heat recovery quantities, the maximum heat recovery quantity $Q_{max}$, and the respective heat recovery efficiency E1, E2, and E3 of the heat recovery drive components 54, 75, and 84.

When the HVAC subsystem 11 operates in the heating mode, the power determination module 105 may determine the amounts of power supplied to the plurality of heat recovery drive components before the calculation of the required heat quantity $Q_{require}$ as their respective operating power. For example, the power determination module 105 may determine first power supplied to the first heat recovery drive component 54 before the calculation of the required heat quantity $Q_{require}$ as first operating power. The power determination module 105 may determine second power supplied to the second heat recovery drive component 75 before the calculation of the required heat quantity $Q_{require}$ as second operating power. The power determination module 105 may determine third power supplied to the third heat recovery drive component 84 before the calculation of the required heat quantity $Q_{require}$ as third operating power.

The power determination module 105 may compare the total sum $Q_{tp}$ obtained by adding the plurality of estimated heat recovery quantities $(Q_{tp}=Q_a+Q_m+Q_i+Q_{in} \ldots)$ and the maximum heat recovery quantity $Q_{max}$ calculated by the heat recovery calculation module 104. The power determination module 105 may determine whether the total sum $Q_{tp}$ of estimated heat recovery quantities is higher than or equal to the maximum heat recovery quantity $Q_{max}$.

When the total sum $Q_{tp}$ of estimated heat recovery quantities is higher than or equal to the maximum heat recovery quantity $Q_{max}$ $(Q_{tp}\geq Q_{max})$, the power determination module 105 may adjust the power supplied to at least one of the heat recovery drive components 54, 75, or 84 to be lower than the corresponding operating power. When the total sum $Q_{tp}$ of estimated heat recovery quantities is higher than or equal to the maximum heat recovery quantity $Q_{max}$ $(Q_{tp}\geq Q_{max})$, the operating power supplied to the heat recovery drive components 54, 75, and 84 may be unnecessarily high. Accordingly, the power determination module 105 may reduce the power supplied to at least one of the heat recovery drive components 54, 75, or 84 below the corresponding operating power so that power consumption of the vehicle thermal management system may be relatively reduced. Thus, electric efficiency of the vehicle may be significantly improved.

According to an embodiment, when the total sum $Q_{tp}$ of estimated heat recovery quantities is higher than or equal to the maximum heat recovery quantity $Q_{max}$ $(Q_{tp}\geq Q_{max})$, the power determination module 105 may adjust power supplied to the heat recovery drive component having the highest heat recovery efficiency among the heat recovery drive components 54, 75, and 84 to be lower than the corresponding operating power. For example, when the heat recovery efficiency E1 of the first heat recovery drive component 54 is higher than the heat recovery efficiency E2 of the second heat recovery drive component 75 (E1>E2), the power determination module 105 may reduce the first power supplied to the first heat recovery drive component 54 below the first operating power by subtracting a predetermined amount of power from the first operating power. When the heat recovery efficiency E1 of the first heat recovery drive component 54 is lower than or equal to the heat recovery efficiency E2 of the second heat recovery drive component 75 (E1≤E2), the power determination module 105 may reduce the second power supplied to the second heat recovery drive component 75 below the second operating power by subtracting a predetermined amount of power from the second operating power.

When the total sum $Q_{tp}$ of estimated heat recovery quantities is lower than the maximum heat recovery quantity $Q_{max}$ $(Q_{tp}<Q_{max})$, the power determination module 105 may adjust the power supplied to at least one of the heat recovery drive components 54, 75, or 84 to be higher than the corresponding operating power. When the total sum $Q_{tp}$ of estimated heat recovery quantities is lower than the maximum heat recovery quantity $Q_{max}$ $(Q_{tp}<Q_{max})$, the operating power supplied to the heat recovery drive components 54, 75, and 84 may be relatively low. Accordingly, the power determination module 105 may increase the power supplied to at least one of the heat recovery drive components 54, 75, or 84 above the corresponding operating power. Thus, the heating performance of the HVAC subsystem 11 may be significantly improved.

According to an embodiment, when the total sum $Q_{tp}$ of estimated heat recovery quantities is lower than the maximum heat recovery quantity $Q_{max}$ $(Q_{tp}<Q_{max})$, the power determination module 105 may adjust power supplied to the heat recovery drive component having the highest heat recovery efficiency among the heat recovery drive components 54, 75, and 84 to be higher than the corresponding operating power. For example, when the heat recovery efficiency E1 of the first heat recovery drive component 54 is higher than the heat recovery efficiency E2 of the second heat recovery drive component 75 (E1>E2), the power determination module 105 may increase the first power supplied to the first heat recovery drive component 54 above the first operating power by adding a predetermined amount of power to the first operating power. When the heat recovery efficiency E1 of the first heat recovery drive component 54 is lower than or equal to the heat recovery efficiency E2 of the second heat recovery drive component 75 (E1≤E2), the power determination module 105 may increase the second power supplied to the second heat recovery drive component 75 above the second operating power by adding a predetermined amount of power to the second operating power.

Figure 3:
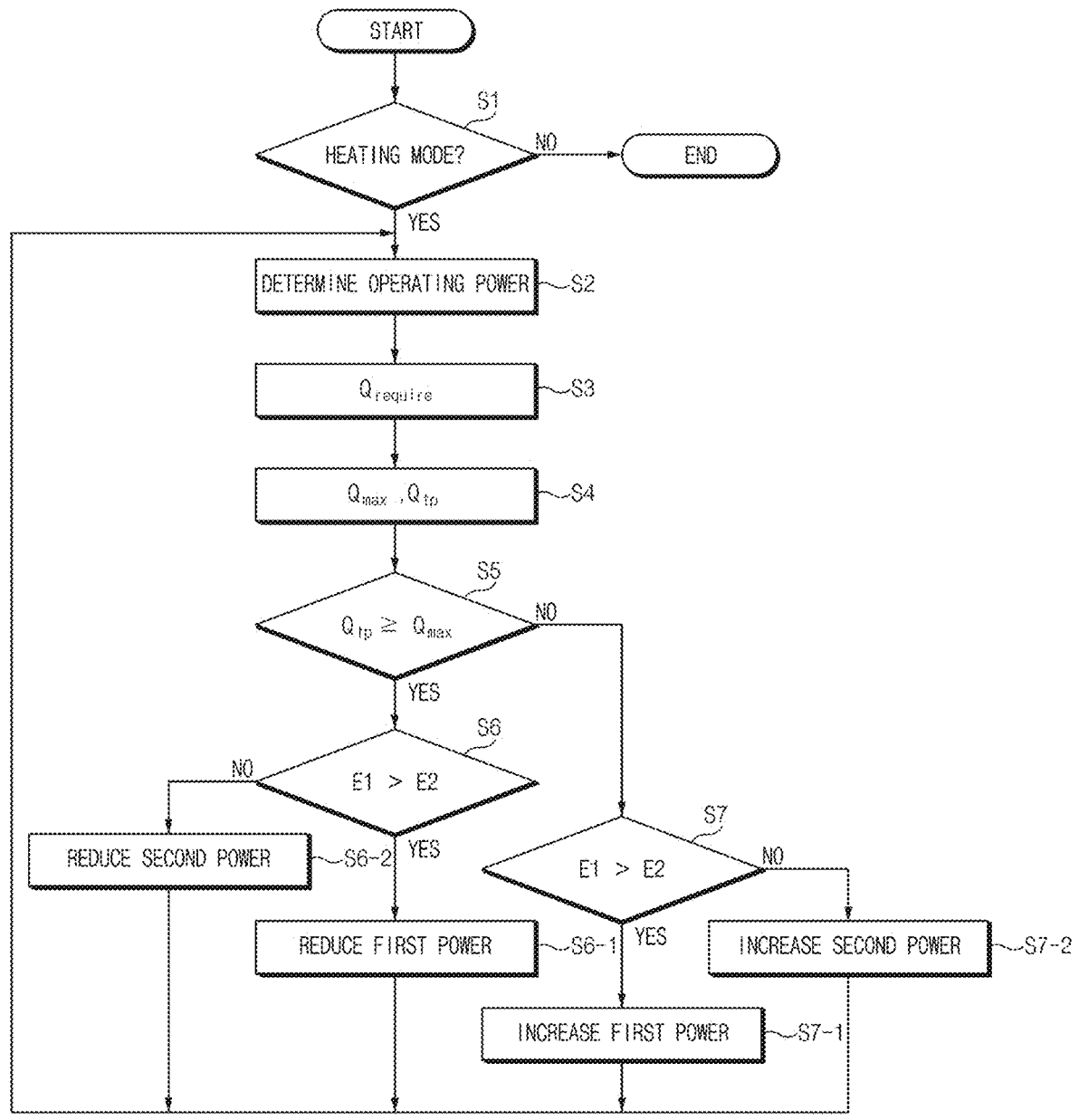
FIG. 3 illustrates a flowchart of a method for controlling a vehicle thermal management system according to an embodiment of the present disclosure.

FIG. 3 illustrates a flowchart of a method for controlling a vehicle thermal management system according to an embodiment of the present disclosure.

Referring to FIG. 3, when the heating of the passenger compartment of the vehicle is required, it may be determined whether the HVAC subsystem 11 operates in a heating mode (S1).

When the HVAC subsystem 11 operates in the heating mode (Yes in S1), the power determination module 105 of the controller 100 may determine the amounts of power supplied to the plurality of heat recovery drive components

54, 75, and 84 before the calculation of a required heat quantity $Q_{require}$ as their respective operating power (S2). For example, the power determination module 105 may determine first power supplied to the first heat recovery drive component 54 before the calculation of the required heat quantity $Q_{require}$ as first operating power. The power determination module 105 may determine second power supplied to the second heat recovery drive component 75 before the calculation of the required heat quantity $Q_{require}$ as second operating power. The power determination module 105 may determine third power supplied to the third heat recovery drive component 84 before the calculation of the required heat quantity $Q_{require}$ as third operating power.

When the HVAC subsystem 11 does not operate in the heating mode (No in S1), the method according to this embodiment of the present disclosure may end.

After the respective operating power of the heat recovery drive components 54, 75, and 84 is determined, the required heat quantity $Q_{require}$, which is required for the heating operation of the HVAC subsystem 11, may be calculated (S3).

After the required heat quantity $Q_{require}$ is calculated, a maximum heat recovery quantity $Q_{max}$ of the HVAC subsystem 11 and a total sum $Q_{tp}$ of estimated heat recovery quantities recoverable from the plurality of heat sources may be calculated based on the required heat quantity $Q_{require}$ and a maximum COP $COP_{max}$ of the HVAC subsystem 11 in the heating mode (S4). In addition, respective heat recovery efficiency E1, E2, and E3 of the heat recovery drive components 54, 75, and 84 may be calculated based on the amounts of power supplied to the heat recovery drive components and the respective estimated heat recovery quantities of the corresponding heat sources.

It may be determined whether the total sum $Q_{tp}$ of estimated heat recovery quantities is higher than or equal to the maximum heat recovery quantity $Q_{max}$ (S5).

When it is determined that the total sum $Q_{tp}$ of estimated heat recovery quantities is higher than or equal to the maximum heat recovery quantity $Q_{max}$ ($Q_{tp} \geq Q_{max}$) (Yes in S5), it may be determined whether the heat recovery efficiency E1 of the first heat recovery drive component 54 is higher than the heat recovery efficiency E2 of the second heat recovery drive component 75 (E1>E2) (S6).

When it is determined that the heat recovery efficiency E1 of the first heat recovery drive component 54 is higher than the heat recovery efficiency E2 of the second heat recovery drive component 75 (E1>E2) (Yes in S6), a predetermined amount of power may be subtracted from the first operating power so that the first power supplied to the first heat recovery drive component 54 may be relatively reduced below the first operating power (S6-1).

When it is determined that the heat recovery efficiency E1 of the first heat recovery drive component 54 is lower than or equal to the heat recovery efficiency E2 of the second heat recovery drive component 75 (E1≤E2) (No in S6), a predetermined amount of power may be subtracted from the second operating power so that the second power supplied to the second heat recovery drive component 75 may be relatively reduced below the second operating power (S6-2).

When it is determined that the total sum $Q_{tp}$ of estimated heat recovery quantities is lower than the maximum heat recovery quantity $Q_{max}$ ($Q_{tp} < Q_{max}$) (No in S5), it may be determined whether the heat recovery efficiency E1 of the first heat recovery drive component 54 is higher than the heat recovery efficiency E2 of the second heat recovery drive component 75 (E1>E2) (S7).

When it is determined that the heat recovery efficiency E1 of the first heat recovery drive component 54 is higher than the heat recovery efficiency E2 of the second heat recovery drive component 75 (E1>E2) (Yes in S7), a predetermined amount of power may be added to the first operating power so that the first power supplied to the first heat recovery drive component 54 may be relatively increased above the first operating power (S7-1).

When it is determined that the heat recovery efficiency E1 of the first heat recovery drive component 54 is lower than or equal to the heat recovery efficiency E2 of the second heat recovery drive component 75 (E1≤E2) (No in S7), a predetermined amount of power may be added to the second operating power so that the second power supplied to the second heat recovery drive component 75 may be relatively increased above the second operating power (S7-2).

As set forth above, the vehicle thermal management system and the method for controlling the same according to embodiments of the present disclosure may optimally control the heat recovery drive components that operate when recovering heat from the heat sources, such as the outdoor air, the power electronic components, and the indoor air of the passenger compartment, thereby optimizing power consumption.

According to embodiments of the present disclosure, when the total sum of estimated heat recovery quantities recoverable from the plurality of heat sources is higher than or equal to the maximum heat recovery quantity of the HVAC subsystem, the operating power supplied to the heat recovery drive components may be unnecessarily high. Accordingly, the power supplied to at least one of the heat recovery drive components may be relatively reduced below the corresponding operating power so that the power consumption of the vehicle thermal management system may be relatively reduced. Thus, the electric efficiency of the vehicle may be significantly improved.

According to embodiments of the present disclosure, when the total sum of estimated heat recovery quantities recoverable from the plurality of heat sources is lower than the maximum heat recovery quantity of the HVAC subsystem, the operating power supplied to the heat recovery drive components may be relatively low. Accordingly, the power supplied to at least one of the heat recovery drive components may be relatively increased above the corresponding operating power. Thus, the heating performance of the HVAC subsystem may be significantly improved.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. A vehicle thermal management system, comprising:
a heating, ventilation, and air conditioning (HVAC) subsystem including a refrigerant circulation path through which a refrigerant circulates;
a power electronics cooling subsystem including a power electronics coolant circulation path through which a power electronics coolant circulates;
a plurality of heat recovery drive components configured to allow the HVAC subsystem to recover heat from a plurality of heat sources when the HVAC subsystem operates in a heating mode; and
a controller, wherein the controller includes a required heat calculation module configured to calculate a required heat quantity for a heating operation of the HVAC subsystem, a coefficient of performance (COP) calculation module configured to calculate a maximum COP of the HVAC subsystem in the heating mode, a heat recovery calculation module configured to calculate a maximum heat recovery quantity of the HVAC subsystem and a total sum of estimated heat recovery quantities recoverable from the plurality of heat sources, and a power determination module configured to determine respective amounts of power input to the plurality of heat recovery drive components based on the total sum of estimated heat recovery quantities and the maximum heat recovery quantity.

2. The vehicle thermal management system according to claim 1, wherein the required heat quantity includes a passenger compartment-required heat quantity, which is required for heating a passenger compartment based on external environmental information and operation information of the HVAC subsystem.

3. The vehicle thermal management system according to claim 1, wherein the required heat quantity includes a passenger compartment-required heat quantity, which is required for heating a passenger compartment, and includes a battery-required heat quantity, which is required for warming up a battery.

4. The vehicle thermal management system according to claim 1, wherein the COP calculation module is further configured to calculate the maximum COP of the HVAC subsystem in the heating mode based on external environmental information and operation information of the HVAC subsystem.

5. The vehicle thermal management system according to claim 1, wherein the heat recovery calculation module is further configured to calculate the maximum heat recovery quantity of the HVAC subsystem based on the required heat quantity calculated by the required heat calculation module and the maximum COP of the HVAC subsystem calculated by the COP calculation module.

6. The vehicle thermal management system according to claim 1, wherein the heat recovery calculation module is further configured to calculate the total sum of estimated heat recovery quantities by calculating respective estimated heat recovery quantities of the heat sources based on operating conditions of the heat recovery drive components and states/conditions of the heat sources and by adding the estimated heat recovery quantities.

7. The vehicle thermal management system according to claim 1, wherein the heat recovery calculation module is further configured to calculate respective heat recovery efficiency of the heat recovery drive components based on the respective amounts of power supplied to the heat recovery drive components and the respective estimated heat recovery quantities of the corresponding heat sources.

8. The vehicle thermal management system according to claim 7, wherein the power determination module is further configured to determine the respective amounts of power input to the plurality of heat recovery drive components based on the total sum of estimated heat recovery quantities, the maximum heat recovery quantity, and the respective heat recovery efficiency of the heat recovery drive components.

9. The vehicle thermal management system according to claim 8, wherein the power determination module reduces power supplied to at least one of the heat recovery drive components when the total sum of estimated heat recovery quantities is higher than or equal to the maximum heat recovery quantity.

10. The vehicle thermal management system according to claim 8, wherein the power determination module reduces power supplied to a heat recovery drive component having a highest heat recovery efficiency among the heat recovery drive components when the total sum of estimated heat recovery quantities is higher than or equal to the maximum heat recovery quantity.

11. The vehicle thermal management system according to claim 8, wherein the power determination module increases power supplied to at least one of the heat recovery drive components when the total sum of estimated heat recovery quantities is lower than the maximum heat recovery quantity.

12. The vehicle thermal management system according to claim 8, wherein the power determination module increases power supplied to a heat recovery drive component having a highest heat recovery efficiency among the heat recovery drive components when the total sum of estimated heat recovery quantities is lower than the maximum heat recovery quantity.

13. The vehicle thermal management system according to claim 1, wherein the plurality of heat sources includes outdoor air, a power electronic component fluidly connected to the power electronics coolant circulation path, and indoor air of a passenger compartment.

14. The vehicle thermal management system according to claim 1, wherein the plurality of heat recovery drive components includes a power electronic pump fluidly connected to the power electronics coolant circulation path, a cooling fan adjacent to an exterior heat exchanger of the HVAC subsystem, and a switching door adjusting airflow between an indoor air passage and an outdoor air passage in an inlet duct of a blower case of the HVAC subsystem.

15. A method for controlling a vehicle thermal management system, the method comprising:

operating an HVAC subsystem in a heating mode;

calculating a required heat quantity for a heating operation of the HVAC subsystem;

calculating a maximum heat recovery quantity of the HVAC subsystem and a total sum of estimated heat recovery quantities recoverable from a plurality of heat sources based on the required heat quantity and a maximum coefficient of performance (COP) of the HVAC subsystem in the heating mode; and determining respective amounts of power input to a plurality of heat recovery drive components based on the maximum heat recovery quantity of the HVAC subsystem and the total sum of estimated heat recovery quantities.

16. The method according to claim 15, further comprising:

calculating respective heat recovery efficiency of the heat recovery drive components based on the respective amounts of power supplied to the heat recovery drive components and the respective estimated heat recovery quantities of the corresponding heat sources; and adjusting and determining the respective amounts of power supplied to the plurality of heat recovery drive components based on the respective heat recovery efficiency of the heat recovery drive components.

* * * * *